US008738669B1

(12) United States Patent
Hsu et al.

(10) Patent No.: US 8,738,669 B1
(45) Date of Patent: May 27, 2014

(54) METHOD AND APPARATUS FOR PROVIDING ACCESS TO DATA OBJECTS WITHIN ANOTHER DATA OBJECT

(75) Inventors: Windsor W. Hsu, San Jose, CA (US); R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 920 days.

(21) Appl. No.: 11/868,882

(22) Filed: Oct. 8, 2007

(51) Int. Cl.
*G06F 17/30* (2006.01)

(52) U.S. Cl.
USPC .......................................................... 707/822

(58) Field of Classification Search
None
See application file for complete search history.

(56) References Cited

U.S. PATENT DOCUMENTS

| | | | | |
|---|---|---|---|---|
| 5,481,701 A | * | 1/1996 | Chambers, IV | 707/101 |
| 6,356,937 B1 | * | 3/2002 | Montville et al. | 709/206 |
| 6,795,803 B1 | * | 9/2004 | Tanaka et al. | 703/24 |
| 6,879,988 B2 | * | 4/2005 | Basin et al. | 707/200 |
| 7,577,689 B1 | * | 8/2009 | Masinter et al. | 1/1 |
| 8,156,188 B1 | * | 4/2012 | Derhak et al. | 709/206 |
| 2003/0231188 A1 | * | 12/2003 | Cohen et al. | 345/629 |
| 2006/0143252 A1 | * | 6/2006 | Perterson et al. | 707/204 |
| 2007/0185914 A1 | * | 8/2007 | Prahlad et al. | 707/200 |
| 2008/0065703 A1 | * | 3/2008 | Wang et al. | 707/203 |

OTHER PUBLICATIONS

ABC Amber Blackberry Converter, (archived by www.archive.org on Sep. 2, 2006, available at http://web.archive.org/web/20060902162007/http://www.processtext.com/abcblackberry.html.).*
Magiclso Inc., http://www.magiciso.com/tutorials, copyright 2002.*

* cited by examiner

*Primary Examiner* — Ajay Bhatia
*Assistant Examiner* — Grace Park
(74) *Attorney, Agent, or Firm* — Blakely Sokoloff Taylor Zafman LLP

(57) ABSTRACT

Techniques for providing access to data objects within another data object are described herein. In one embodiment, a compound object including multiple data objects is received and metadata is extracted for a data object from the compound object, where the metadata includes a layout of the data object in view of the compound object. Subsequently, access to one or more of the data objects within the compound object is provided based on the extracted metadata without using an application associated with the compound object. Other methods and apparatuses are also described.

18 Claims, 9 Drawing Sheets

| Object ID | Size | Offset 1 | Length 1 | Offset 2 | Length 2 | ... | ACL | Other Attributes |
|---|---|---|---|---|---|---|---|---|
| Object 1 | | | | | | | | |
| Object 2 | | | | | | | | |
| ⋮ | ⋮ | ⋮ | ⋮ | ⋮ | ⋮ | ⋮ | ⋮ | ⋮ |

FIG. 3A

```
mode_t  st_mode;      /* protection */
uid_t   st_uid;       /* user ID of owner */
gid_t   st_gid;       /* group ID of owner */
off_t   st_size;      /* total size, in bytes */
time_t  st_atime;     /* time of last access */
time_t  st_mtime;     /* time of last modification */
time_t  st_ctime;     /* time of last status change */
```

FIG. 3B

METHOD AND APPARATUS FOR PROVIDING ACCESS TO DATA OBJECTS WITHIN ANOTHER DATA OBJECT

FIELD OF THE INVENTION

The present invention relates generally to providing access to data objects stored in data storage. More particularly, this invention relates to providing access to individual data objects within a compound data object.

BACKGROUND

Many applications pack multiple data objects in another data object. Examples of such applications include file systems, database management systems, computer-aided design (CAD) systems, programs and utilities that handle backup, restore and archiving of data, programs and utilities that manage emails and instant messages, etc. Examples of data objects include emails, instant messages, CAD designs, files, records, documents, ISO images, file system images, etc.

Such packing is attractive for several reasons. For example, it may help to overcome performance and/or scalability issues in supporting many objects. The packing may also make it easier to manage objects by keeping related objects together. Packing multiple objects and associated metadata together may also help to reduce dependencies on the system used to store the objects.

Once packed, however, the objects become difficult to access. Each application tends to have its own format or way of packing objects so that the objects must typically be accessed through the application that packed them. In many cases, the application that packed the objects may not be available when there is a need to access the objects. In addition, many of these applications do not provide direct access to the objects through standard interfaces. With some applications, the objects have to be unpacked before they can be accessed.

One approach to providing access to individual objects in a compound object is to determine the format of the compound object. There are, however, many different applications that pack objects and the formats they use tend to be proprietary and could change over time. Another approach is to extend the applications to provide a standard interface for accessing the individual objects but again there are numerous applications that pack objects.

Many of the applications provide a tool such as, for example, a computer program, application, or utility software to unpack the individual objects in which case an alternative is to unpack the compound object and store the individual objects so that the individual objects can be directly accessed. Such an approach, however, requires significant resources to perform the unpacking and to store the individual objects.

SUMMARY OF THE DESCRIPTION

Techniques for providing access to data objects within another data object are described herein. In one embodiment, a compound object including multiple data objects is received and metadata is extracted for a data object from the compound object, where the metadata includes a layout of the data object in view of the compound object. Subsequently, access to the data object within the compound object is provided based on the extracted metadata without using an application associated with the compound object.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A-3B are diagrams illustrating examples of metadata of a data object according to certain embodiments of the invention.

DETAILED DESCRIPTION

Techniques for providing access to data objects within another data object are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, an unpack tool may be used to obtain certain information about individual data objects within another data object (also referred to as a compound object). For example, by analyzing the input and output streams of an unpack tool associated with the compound object, certain information of individual objects packed within the compound object, such as, layout, name, size, and/or access control attributes may be determined. This information may be stored separately as metadata which may be used subsequently for directly accessing the individual data objects without having to use the unpack tool or an application associated with the compound object that understands the format of the compound object. The metadata may also be incorporated into a file directory of a file system such that the individual data objects can be accessed via standard file system protocols. Note that a compound data object may be packed as an individual data object (e.g., individual compound data object) within another compound data object.

Figure 1:
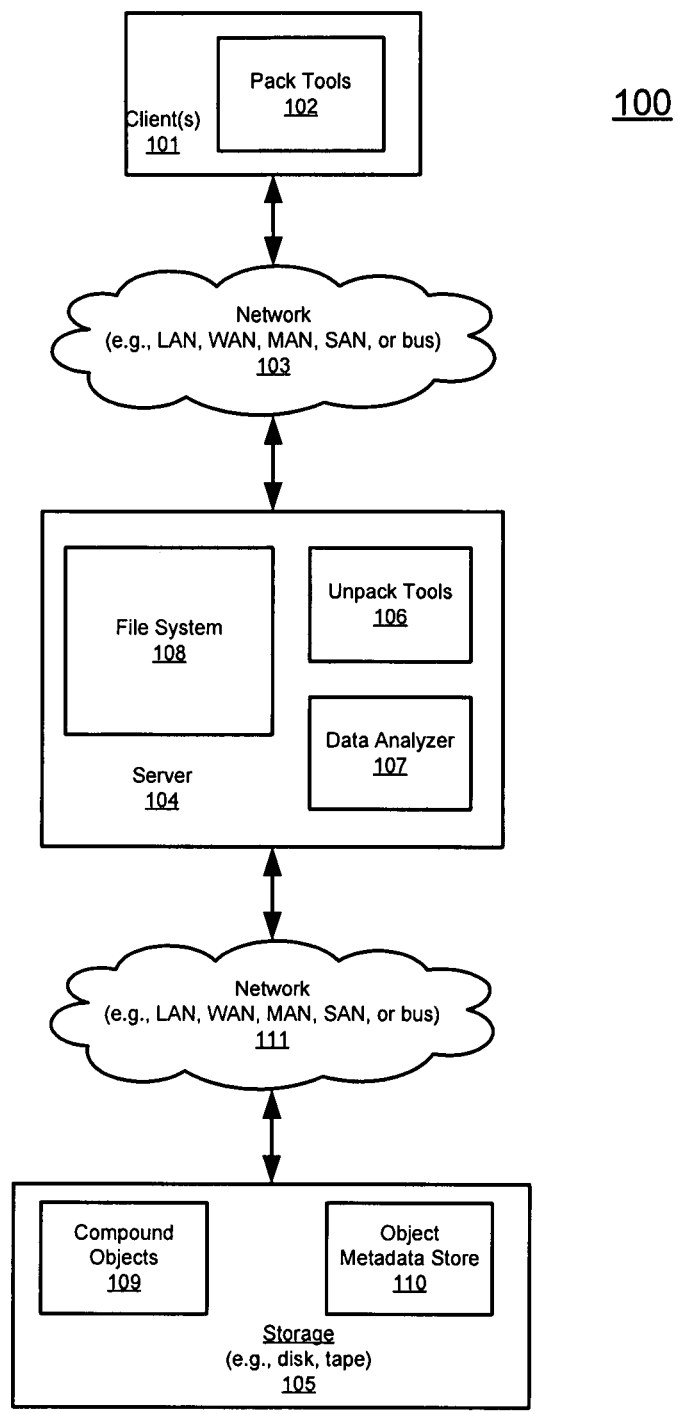
FIG. 1 is a block diagram illustrating a system configuration according to one embodiment of the invention.

FIG. 1 is a block diagram illustrating a system configuration according to one embodiment of the invention. Referring to FIG. 1, system configuration 100 includes, but is not limited to, one or more clients 101 communicatively coupled to a server 104 over a network 103 to access data stored in storage 105 over a network 111. Clients 101 may be any type of client such as a server, a personal computer, a "thin" client, a personal digital assistant (PDA), a Web enabled appliance, or a Web enabled cellular phone, etc. Server 104 may include any type of server or cluster of servers. For example, server 104 may be a storage server used for any of various different purposes, such as to provide multiple users with access to shared data and/or to back up mission critical data. Server 104 may be, for example, a file server (e.g., an appliance used to provide NAS capability), a block-based storage server (e.g., used to provide SAN capability), a unified storage server (e.g., one which combines NAS and SAN capabilities), a nearline storage server, a direct attached storage (DAS) server, a tape backup server, or essentially any other type of data storage server. Server 104 may have a distributed architecture, or all of its components may be integrated into a single unit.

Network 103, as well as network 111, may be any type of network such as a local area network (LAN), a wide area network (WAN) such as Internet, a corporate intranet, a metropolitan area network (MAN), a storage area network (SAN), a bus, or a combination thereof. Storage 105 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage 105 may also be combinations of such devices. Storage 105 may be organized into one or more volumes of Redundant Array of Inexpensive Disks (RAID). Server 104 and/or storage 105 may be implemented as part of a nearline and/or backup systems such as the deduplication systems available from Data Domain, Inc. of Santa Clara, Calif.

According to one embodiment, server 104 includes a file (or object) system 108. File system 108 may be any kind of file system. A file system generally refers to a structuring of data and metadata on a storage device, such as disks, which permits reading/writing of data on those disks and/or the processing logic to enable such structuring. The metadata is organized in data structures such as inodes that are used to store information about a file, where the data blocks are structures used to store the actual data for the file. The information contained in an inode, as shown in FIG. 3B, may include, for example, ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file.

In one embodiment, server 104 may maintain unpack tools 106 that can unpack certain types of compound object. Server 104 may further include a data analyzer 107 for analyzing input and output of an unpack tool being executed in server 104 or client(s) 101. As described above, client 101 may utilize certain applications including pack tools 102 that pack or organize certain data objects into a compound object to be part of compound objects 109 stored in storage 105.

According to one embodiment, a compound object is received at server 104 or file system 108 to be stored in storage 105. The compound object is stored in storage 105 as part of compound objects 109. An unpack tool (e.g., unpack tools 106) corresponding to the compound object is identified, for example, based on certain attributes such as a file type or name of the compound object. The identified unpack tool is invoked to attempt unpacking selected objects from the compound object which in general creates a new instance of the selected objects at a target location (e.g. a specified directory in a file system).

According to one embodiment, during the invocation of the identified unpack tool, data analyzer 107 is used to analyze the input and output of the unpack tool to obtain certain metadata for each data object embedded within the compound object. The metadata may include, but is not limited to, an identifier of an individual data object, a size and location of the data object within the compound object, and/or an access control attribute associated with the data object, etc. The metadata for each of the individual data object of the compound object may be stored in object metadata store 110. In one embodiment, after the metadata of each data object has been extracted, the instance of the data object is ignored or alternatively, the creation of the instance of a data object may be skipped entirely.

In one embodiment, the identified unpack tool is invoked in response to receiving a compound object to be stored in storage 105. In one embodiment, the identified unpack tool is invoked periodically on a compound object received in the last period. In one embodiment, the identified unpack tool is invoked in response to a user command.

Note that data analyzer 107 may be implemented as part of file system 108 or alternatively, data analyzer 107 may be implemented separately either in a user space (e.g., as an application) or in a kernel space (e.g., as a driver) of an operating system, as long as it can intercept the input and output of a unpack tool.

Subsequently, when a user or client such as client 101 attempts to access individual data objects within the compound objects 109, metadata of the individual objects stored in object metadata store 110 may be used to determine the size and location of the individual data objects being accessed within the corresponding compound object. The individual data objects being accessed can then be retrieved and returned to the user or client from the corresponding compound object based on the metadata associated with the individual data objects being accessed, without having to use the unpack tools 106 and/or pack tools 102. According to one embodiment, object metadata store 110 may be incorporated into a file directory of a file system such as file system 108. As a result, a user can access the individual data objects as if the individual data objects are stored as individual files in a file system, even though these individual data objects are physically packed within a compound object. These individual objects can then be accessed via standard file system commands of the file system and/or standard user interfaces such as that shown in FIG. 7.

As described above, one approach according to one embodiment is to leverage a unpack tool associated with an application or pack tool that pack or organize certain data objects into a compound object. The unpack tool associated with an application is a program that can create a new instance of an individual object contained in a compound object that was created by that application. Backup applications, for example, typically provide a restore utility that takes a backup file or tape and creates new instances of the files contained in it. For file systems, commands such as "cp -r" in UNIX can be used to create new instances of all the files in a file system. Sequences of commands that pack up the files and than unpack the files (e.g., "tar -c" followed by "tar -x", backup followed by restore, etc) can also be used to similar effect. Many of these utilities can be configured to create new instances of only the individual objects that are of interest.

By appropriately analyzing the input and output of such unpack tools, the attributes of the individual objects and how these objects are laid out in the compound object may be determined. Because these tools tend to operate in a stream fashion processing data in order as the data is read, such a determination can be efficiently accomplished. Thus, by leveraging the unpack tool associated with an application; the system is able to provide access to individual objects packed by various applications without the need to determine the corresponding compound object formats.

Figure 2:
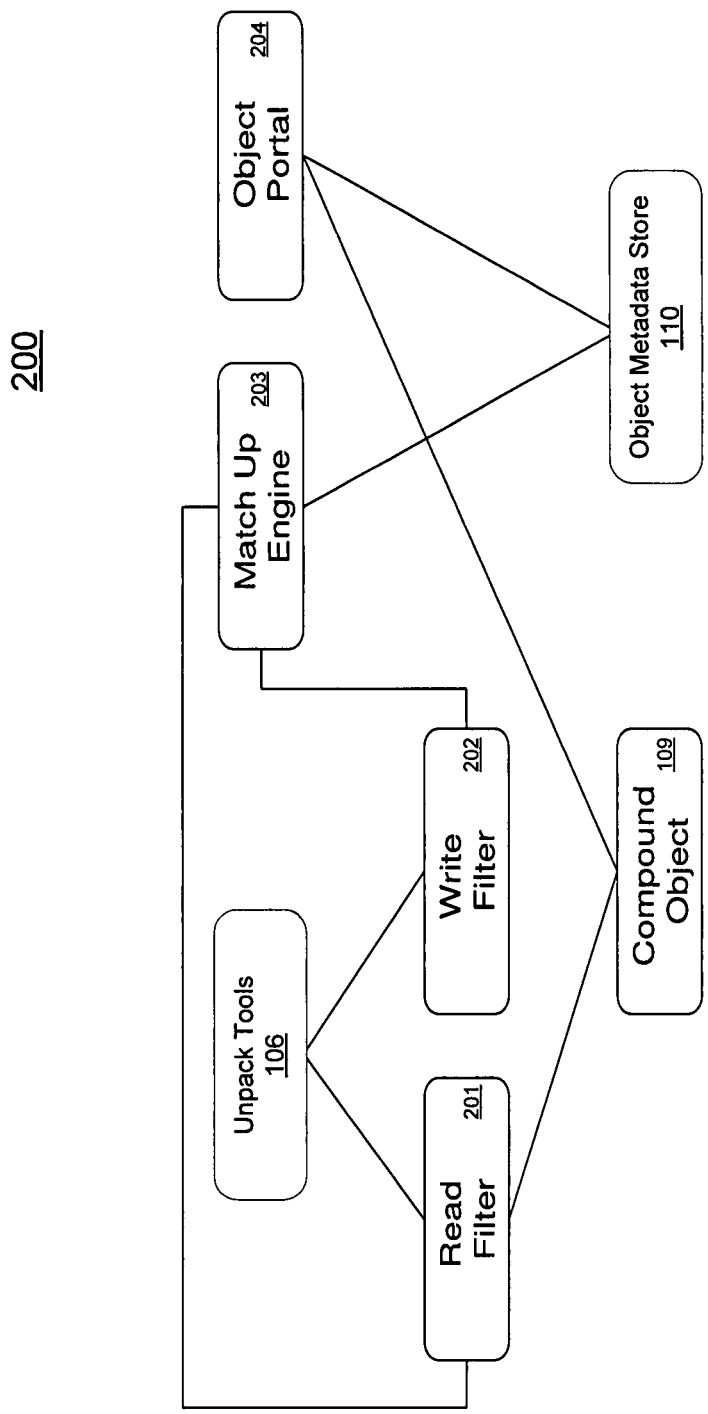
FIG. 2 is a block diagram illustrating a system for extracting metadata from a compound object according to one embodiment of the invention.

FIG. 2 is a block diagram illustrating a system for extracting metadata from a compound object according to one embodiment of the invention. For example, system 200 may be implemented as part of server 104 and/or storage 105 of FIG. 1. For the purposes of consistency, certain reference numbers are maintained identical with respect to FIG. 1. Referring to FIG. 2, when a compound object 109 is received at system 200 (e.g., via file system or other APIs) intended to be stored in a storage system such as storage 105 of FIG. 1, an unpack tool 106 corresponding to the compound object is identified. For example, the unpack tool may be identified based on a type or name of the compound object. After the unpack tool 106 has been identified, system 200 invokes the unpack tool 106 to operate on the compound object to attempt to unpack the compound object.

As the unpack tool 106 attempts to unpack the compound object 109, a read filter 201 collects information about the read operations that the unpack tool 106 performs and hands the information to a match-up engine 203. In one embodiment, the information collected by the read filter 201 includes, but is not limited to, the data being read and its location within the compound object 109. As the unpack tool 106 attempts to create a new instance of an individual object, a write filter 202 collects information about the operations that the unpack utility 106 performs to create the new instance of the object and hands the information to the match-up engine 203. In one embodiment, the information collected by the write filter 202 includes, but is not limited to, a name or an identifier associated with an object being created, a value of an attribute being set, and/or data being written. In one embodiment, the write filter 202 discards the operations performed by the tool to create the new instance of the object so that the operations are not actually performed and the new instance of the object is not actually created. Instead, only the metadata of the object is obtained or extracted.

The read and write filters 201-202 may be implemented in various ways. In one embodiment, the read and write filters 201-202 are implemented by interposing software code in the relevant system calls or routines to collect the required information. For example, to collect the name associated with an object, software code is introduced in the object create a routine to collect that information. In one embodiment, the read and write filters 201-202 may be implemented as part of an installable file system (IFS). An IFS enables new file systems and/or file system filters to be added to an operating system without having to modify the operating system kernel.

Alternatively, the read and write filters 201-202 may be implemented as a layer in a stackable file system. In a stackable file system, complex filing services are constructed from layer "building blocks," each of which may be provided by independent parties. There are no syntactic constraints to layer order, and layers can occupy different address spaces, allowing very flexible layer configuration. Independent layer evolution and development are supported by an extensible interface bounding each layer.

In another embodiment, the read and write filters are implemented using a file system in user space (FUSE) package available with operating systems such as Linux. The FUSE is designed to allow a non-privileged user to create new file systems and/or file system filters without having to modify any kernel code of an operating system. This is achieved by running the new file system code, which in this case includes the read and write filters 201-202, in a user space, while the FUSE only provides a "bridge" to the actual kernel interfaces.

Referring back to FIG. 2, the match-up engine 203 analyzes the information collected by the read and write filters 201-202 to determine metadata about an individual object in the compound object 109. The determined metadata may be stored in object metadata store 110, which may be implemented in a manner similar to those as shown in FIG. 3A. Additional information such as those as shown in FIG. 3B may also be extracted and stored in metadata store 110. Note that some or all of the components as shown in FIG. 2 may be implemented in software, hardware, or a combination thereof.

Figure 4:
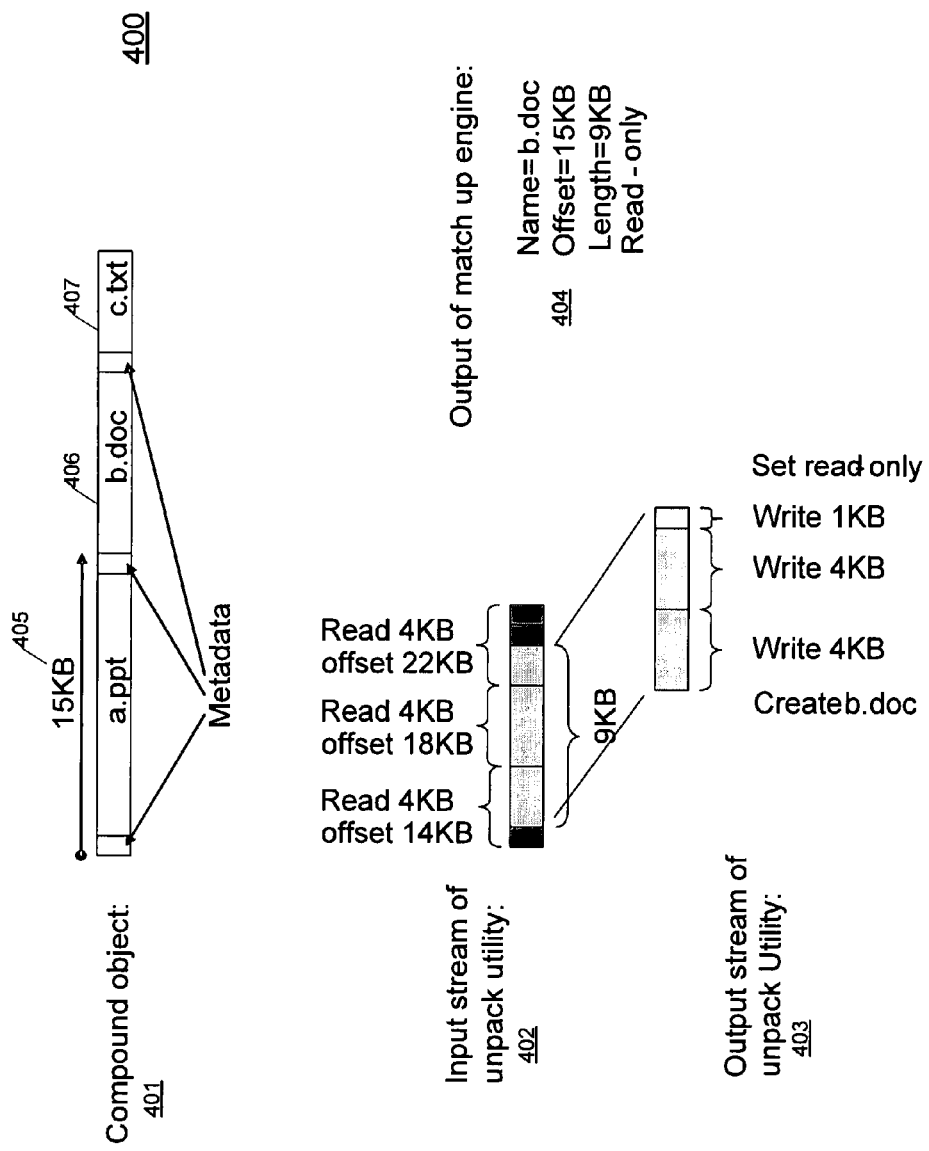
FIG. 4 is a diagram illustrating a process for extracting metadata of data objects from a compound object according to one embodiment of the invention.

FIG. 4 is a diagram illustrating a process for extracting metadata of data objects from a compound object according to one embodiment of the invention. Referring to FIG. 4, in this example, files "a.ppt" 405, "b.doc" 406, and "c.txt" 407 are packed in a compound object 401. The object of interest is "b.doc" 406. An unpack tool reads the relevant contents of the compound object 401 and attempts to create at a target location (e.g. a specified directory in a file system) a new instance of file "b.doc" 406. In the example, the tool issues a 4 KB read operation of the compound object 401 beginning at an offset of 14 KB. The first 4 KB read includes 1 KB of metadata followed by 3 KB of the contents of file "b.doc" 406. The second 4 KB read includes 4 KB of the contents of file "b.doc" 406. The third 4 KB read includes 1 KB of the contents of file "b.doc" 406, metadata for file "c.txt" 407 and some contents of file "c.txt" 407. As the unpack tool reads the compound object 401, it attempts to create a new instance of the object "b.doc" 406 and write data associated with "b.doc" 406 to the created object. It also sets any attributes associated with "b.doc" 406 on the created object.

The set of commands issued by the unpack tool and the data associated with the commands (e.g., input 402 and output 403) are collected by the read and write filters (e.g., filters 201-202 of FIG. 2) and sent to a match-up engine (e.g., match-up engine 203 of FIG. 2) for analysis. The match-up engine compares and attempts to align the data read by the unpack tool to the data written by the tool. In this example, the match-up engine determines that the first 9 KB of data written by the unpack tool matches the data beginning at an offset of 1 KB in the data read by the tool. By identifying the commands issued by the tool to read this 9 KB of data, the match-up engine determines that this 9 KB of data occurs at an offset of 15 KB in the compound object. The match-up engine further associates the first 9 KB of data written with the "create b.doc" command and the set read-only command. In this way, the match-up engine is able to determine as part of metadata 404 that the object "b.doc" exists in the compound object at an offset of 15 KB, runs for 9 KB, and is read-only.

Note that the individual objects may not be laid out sequentially in the compound object. The contents of an individual object may, for example, be interspersed by metadata such as inodes, headers, tape markers, etc or by contents of other objects.

It should be apparent that various algorithms including string and pattern matching algorithms can be used to perform the alignment between the data read and written by the unpack tool. Furthermore, various optimizations can be used to speed up the process if assumptions are made about the layout of individual objects in the compound object. For example, if the individual objects are 512-byte aligned within the compound object, the comparison may be performed on a 512-byte basis.

According to one embodiment, for example, the metadata read by the unpack tool is interpreted by a read filter to determine the length of the object being read. The read filter then discards the subsequent operations issued by the unpack tool to read the contents of the object. Instead of passing these operations through to actually perform the read, the read filter makes up data to be handed back to the unpack tool as results of the read operations. In this example as shown in FIG. 4, the match-up engine receives information from the read filter that 9 KB of data beginning at offset 15 KB in the compound object is read by the unpack tool. The match-up engine further receives information from a write filter that the unpack tool attempts to create an object "b.doc", write 9 KB of data to it, and set an attribute of read-only on it. By assuming that data is read and written in order and that there are no intervening extraneous data, the match-up engine is able to conclude without comparing any data that an object "b.doc" exists in the compound object 401 at an offset of 15 KB, runs for 9 KB, and is read-only.

In one embodiment, the read filter determines (e.g. based on the offset being read) whether the data being read by the unpack tool contains metadata or contents of individual objects. If the data being read contains contents of individual objects, the read filter discards the read operation and instead makes up data to be handed back to the tool as results of the read operation.

Referring back to FIG. 2, according to one embodiment, the information about individual objects determined by the match-up engine are stored and managed in the object metadata store 110. In one embodiment, the object metadata store 110 may be implemented as a database. In one embodiment, the object metadata store 110 may be implemented using a directory of a file system. Subsequently, upon receiving a request to access an individual object, the object portal 204 consults the object metadata store 110 to determine if the requested object exists and if so, its location within the compound object 109 based on the metadata associated with the object being accessed. The object portal 204 then uses this information to access a relevant portion of the compound object 109 to retrieve the requested object. In one embodiment, the object portal 204 performs access control by checking permissions or access control lists (ACLs) associated with the individual object.

Figure 5:
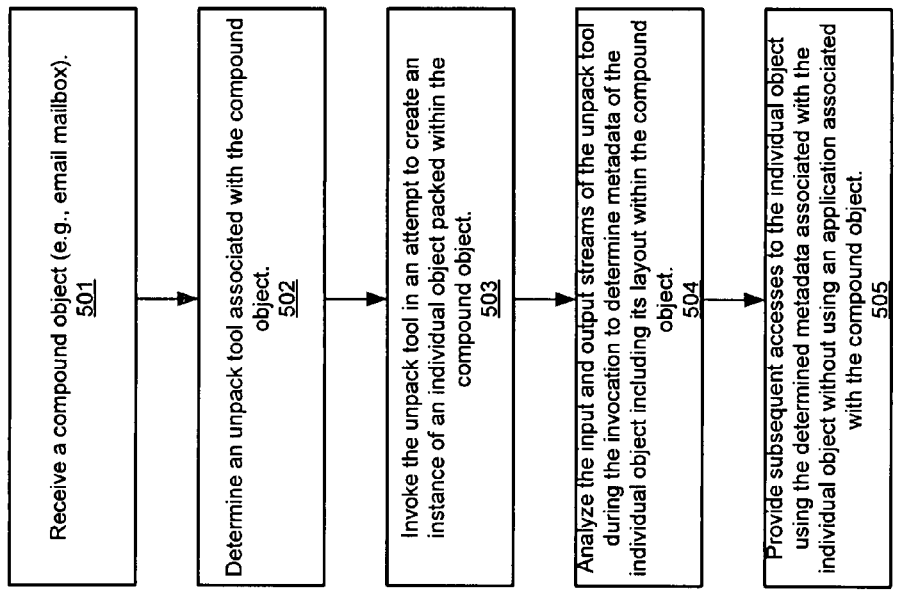
FIG. 5 is a flow diagram illustrating a process for providing access to data objects within another data object according to one embodiment of the invention.

FIG. 5 is a flow diagram illustrating a process for providing access to data objects within another data object according to one embodiment of the invention. Note that process 500 may be performed by processing logic which may include software, hardware, or a combination thereof. For example, process 500 may be performed by system 200 of FIG. 2. Referring to FIG. 5, at block 501, a compound object is received. At block 502, an unpack tool corresponding to the compound object is identified. At block 503, the unpack tool is invoked or executed in an attempt to create a new instance of an individual object packed within the compound object. At block 504, the input and output of the unpack utility while operating on the compound object is analyzed to determine and extract metadata associated with the individual object, including its layout within the compound object. At block 505, subsequent access to the individual object are provided using the metadata associated with the individual object without having to use the unpack tool or an application associated with the compound object that understands the format of the compound object. Other operations may also be performed.

Figure 7:
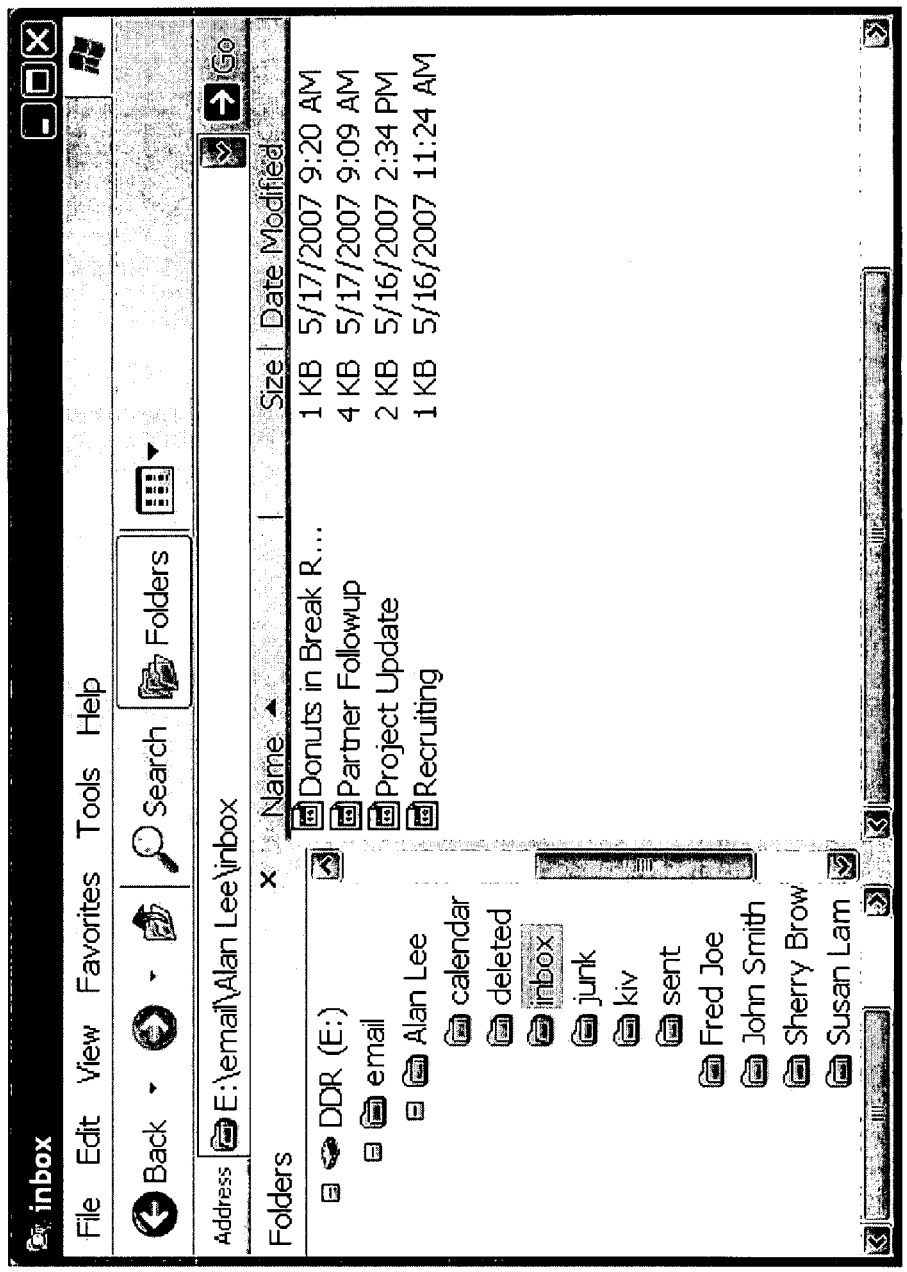
FIG. 7 is a screenshot illustrating a graphical user interface (GUI) which may be used in accordance with one embodiment of the invention.

Referring back to FIG. 2, according to one embodiment, the object portal 204 may export individual objects in a file system namespace so that the individual objects can be accessed through standard file system calls and remote file system protocols (e.g., NAS). For example, FIG. 7 shows emails exported in a file system namespace that can be browsed by a browser such as a Windows Explorer. By exporting the individual objects in a file system namespace, applications (e.g. index and search, text analytics, virus scan, security audit, data mining) that support standard file system interfaces are able to access the individual objects directly from the compound object 109.

Figure 6:
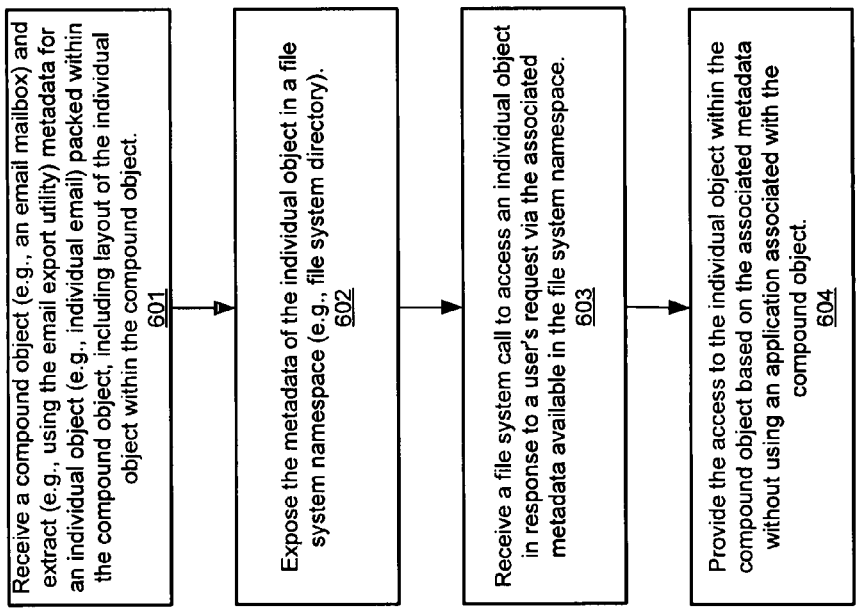
FIG. 6 is a flow diagram illustrating a process for providing access to data objects within another data object according to another embodiment of the invention.

FIG. 6 is a flow diagram illustrating a process for providing access to data objects within another data object according to an embodiment of the invention. Note that process 600 may be performed by processing logic which may include software, hardware, or a combination thereof. For example, process 600 may be performed by system 200 of FIG. 2. Referring to FIG. 6, at block 601, a compound object is received to be stored in a storage, metadata for each of selected individual objects packed within the compound object is extracted, for example, using a corresponding unpack tool, including a layout of each selected individual object. At block 602, the extracted metadata is exposed in a directory of a file system. Subsequently at block 603, a file system call is received to access an individual object in response to a user's request via the associated metadata available in the file system namespace. At block 604, processing logic provides access to the requested individual object within the compound object based on the associated metadata without having to use the unpack tool or an application associated with the compound object.

In one embodiment, embodiments of the invention described throughout this application may be implemented with a Data Domain Restorer to provide access to files packed in backup or archive images that are stored in the Data Domain Restorer. In this embodiment, an application that packs or organizes certain individual objects into a compound object is the backup or archive application such as for example Symantec NetBackup, Symantec Enterprise Vault, CommVault Simpana, EMC NetWorker, EMC DiskXtender, IBM TSM, tar, cpio, etc. Individual objects are files, emails and other objects that have been backed up or archived. A compound object is the backup or archive image. The unpack tool is the restore utility associated with the backup or archive application.

In one embodiment, embodiments of the invention may be implemented with a block (e.g. iSCSI or Internet small computer system interface) storage system to provide access to files in a file system (or snapshot of a file system) that is stored in the block storage system. In computing, particularly data storage, a block is a sequence of bytes or bits, having a nominal length (e.g., a block size). Data thus structured is said to be "blocked". The process of putting data into blocks is called blocking. Certain file systems are based on a block device, which is a level of abstraction for the hardware responsible for storing and retrieving specified blocks of data. Block storage is normally abstracted by a file system or database management system for use by applications and end users. The physical or logical volumes accessed via block I/O may be devices internal to a server, direct attached via SCSI or Fibre Channel, or distant devices accessed via a storage area network (SAN) using a protocol such as iSCSI, or AoE (advanced technology attachment or ATA over Ethernet). Database management systems (DBMS) often use their own block I/O for improved performance and recoverability as compared to layering the DBMS on top of a file system.

In this example, the individual objects are files in the file system. The compound object is the file system image or the set of blocks containing the file system. The unpack tool is simply the file copy command.

Alternatively, embodiments of the invention may be used to provide access to emails that an email application has stored in at least one large file. In this embodiment, the individual objects are the emails. The compound object is the file in which the emails are stored. The unpack tool is the export utility associated with the email application. Other application areas may also be applied.

Figure 8:
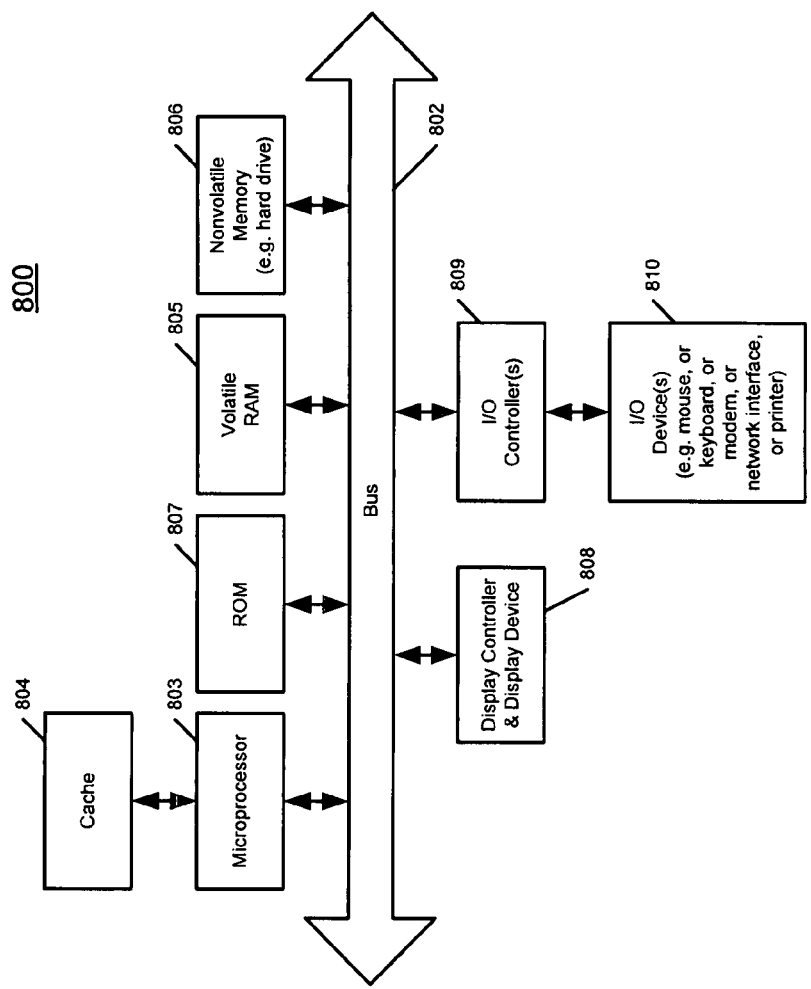
FIG. 8 is a block diagram of a data processing system which may be used with one embodiment of the invention.

FIG. 8 is a block diagram of a data processing system which may be used with one embodiment of the invention. For example, system 800 shown in FIG. 8 may be used as a client computer system such as client 101 of FIG. 1. Alternatively, system 800 may be implemented as a server 104 or storage 105 of FIG. 1.

Note that while FIG. 8 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 8 may, for example, be an Apple Macintosh computer or an IBM compatible PC.

As shown in FIG. 8, the computer system 800, which is in a form of a data processing system, includes a bus or interconnect 802 coupled to a processor 803 and a ROM 807, a volatile RAM 805, and a non-volatile memory 806. Processor 803 may include multiple processors and/or core logics that constitute central processing units (CPUs) of the system and thus, control the overall operations of the system. According to certain embodiments, processor 803 accomplish this by executing software stored in any of the memories 805-807, such as, for example, applications and operating system, etc. Processor 803 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 803, which may be, for example, an Intel processor or a PowerPC processor, is coupled to cache memory 804 as shown in the example of FIG. 8. The bus 802 interconnects these various components together and also interconnects these components 803 and 805-807 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices. Other components may also be included.

Thus, techniques for providing access to data objects within another data object have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus.

Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data objects, comprising:
    storing a compound object in a storage, the compound object being a binary file image having a plurality of data objects embedded therein, wherein the compound object is a compressed backup file and the storage is a backup storage;
    extracting metadata for each of the plurality of data objects from the compound object including
        identifying an unpack tool associated with the compound object based on a type of the compound object, wherein the identified unpack tool is selected from a plurality of unpack tools corresponding to a plurality of different types of compound objects,
        executing the identified unpack tool on the compound object to extract the metadata for each data object packed within the compound object without creating an instance of the data object from the compound object, wherein the metadata includes a layout of each data object in view of the compound object, including a size of each data object and a location of each data object within the compound object, the location representing an offset from beginning of the binary file image of the compound object, wherein the metadata further includes an access control list (ACL) attribute of a corresponding one of the data objects, wherein the metadata allows all data objects of the plurality of data objects to be accessed directly from the compound object without an instance of each data object being created;
    storing the extracted metadata in a metadata store that is separated from a storage location storing the compound object;
    exporting the metadata of the data objects in a file system namespace of a file system of the storage based on the metadata, such that each of the data objects is presented by the file system as if the corresponding data object were stored as a separate physical file in the storage when the data object is individually accessed;
    subsequently, in response to a request for accessing a first data object within the compound object, determining a size and a location of the first data object within the compound object based on the metadata associated with the first data object stored the metadata store; and
    providing access to the first data object directly from the compound object at the determined location within the compound object without using an application that understands a format of the compound object.

2. The method of claim 1, wherein the access to the first data object within the compound object is provided via a standard file system call of a file system that manages files stored in the storage, including the compound object and the metadata store.

3. The method of claim 1, wherein providing access to the first data object within the compound object comprises:
    extracting an image of the first data object having the determined size from the determined location of the compound object, wherein the determined location represents an offset from the beginning of the compound object; and
    transmitting the image of the first data object to a client of the request without understanding content of the first data object.

4. The method of claim 1, further comprising exporting the first data object in a namespace of a file system using the extracted metadata associated with the first data object, such that the first data object is accessible via a standard system call of the file system.

5. The method of claim 4, wherein the compound object is an email mailbox and data objects included therein are individual emails.

6. The method of claim 5, further comprising collecting input data and output data of the identified unpack tool operating on the compound object.

7. The method of claim 6 further comprising extracting the metadata from the collected input data and output data of the identified unpack tool operating on the compound object.

8. The method of claim 7, further comprising, in response to an operation of the identified unpack tool, capturing an offset of the data object within the compound object, an identifier of the data object, and a size of the data object as a part of the metadata.

9. The method of claim 7, further comprising capturing an access control attribute of the data object during the write operation, wherein the subsequent access is provided dependent upon the captured access control attribute of the data object.

10. An apparatus for managing data objects, comprising:
    a processor;
    a storage device to store a compound object, the compound object being a binary file image having a plurality of data objects embedded therein, wherein the compound object is a compressed backup file and the storage is a backup storage; and
    memory to store instructions, which when executed from the memory, cause the processor to
        execute a match-up engine in the memory to extract metadata for each of the data objects from the compound object including
            identifying an unpack tool associated with the compound object based on a type of the compound object, wherein the identified unpack tool is selected from a plurality of unpack tools corresponding to a plurality of different types of compound objects, executing the identified unpack tool on the compound object to extract the metadata for the data object packed within the compound object without creating an instance of the data object from the compound object, wherein the metadata includes a layout of the data object in view of the compound object, including a size of each data object and a location of each data object within the compound object, the location representing an offset from beginning of the binary file image of the compound object, wherein the metadata further includes an access control list (ACL) attribute of a corresponding one of the data objects, wherein the metadata allows all data objects of the plurality of data objects to be accessed directly from the compound object without an instance of each data object being created, store the metadata of the compound object in a metadata store maintained within the storage device, wherein the metadata is stored in a separate storage location from the compound object, wherein the metadata of the data objects is exported in a file system namespace of a file system of the storage based on the metadata, such that each of the data objects is presented by the file system as if the corresponding data object were stored as a separate physical file in the storage when the data object is individually accessed, and execute an object portal in the memory subsequently, in response to a request for accessing a first data object within the compound object, to determine a size and a location of the first data object within the compound object based on the metadata of the first data object obtained from the metadata store and to provide access to the first data object directly from the compound object at the determined location within the compound object without using an application that understands a format of the compound object.

11. The apparatus of claim 10, further comprising a file system executed in the memory to manage files stored in the storage including the compound object and the metadata store, wherein the object portal is configured to provide the access to the first data object via a standard file system call of the file system.

12. The apparatus of claim 10, wherein the metadata store is incorporated into a file directory of a file system, such that the first data object is accessible via a standard system call of the file system.

13. The apparatus of claim 12, wherein the compound object comprises an email mailbox and the plurality of data objects within the compound object comprises individual emails.

14. The apparatus of claim 13, further comprising:
a read filter executed in the memory by the processor to capture the input data when the unpack tool reads from the compound object, including a location being read within the compound object; and
a write filter executed in the memory by the processor to capture the output data when the unpack tool attempts to create a new instance of each data object, including an identifier of the data object.

15. The apparatus of claim 14, wherein the write filter further captures an access control attribute when the unpack tool attempts to set the access control attribute to the new instance of the data object, and wherein the object portal is configured to apply the access control to the first data object.

16. A non-transitory machine-readable medium having computer instructions stored therein, which when executed by a processor, cause the processor to perform a method for managing data objects, the method comprising:
storing a compound object in a storage, the compound object being a binary file image having a plurality of data objects embedded therein, wherein the compound object is a compressed backup file and the storage is a backup storage;
extracting metadata for each of the data objects from the compound object, including
identifying an unpack tool associated with the compound object based on a type of the compound object, wherein the identified unpack tool is selected from a plurality of unpack tools corresponding to a plurality of different types of compound objects,
executing the identified unpack tool on the compound object to extract the metadata for each data object packed within the compound object without creating an instance of the data object from the compound object, wherein the metadata includes a layout of each data object in view of the compound object, including a size of each data object and a location of each data object within the compound object, the location representing an offset from beginning of the binary file image of the compound object, wherein the metadata further includes an access control list (ACL) attribute of a corresponding one of the data objects, wherein the metadata allows all data objects of the plurality of data objects to be accessed directly from the compound object without an instance of each data object being created;
storing the extracted metadata in a metadata store that is separated from a storage location storing the compound object;
exporting the metadata of the data objects in a file system namespace of a file system of the storage based on the metadata, such that each of the data objects is presented by the file system as if the corresponding data object were stored as a separate physical file in the storage when the data object is individually accessed;
subsequently, in response to a request for accessing a first data object within the compound object, determining a size and a location of the first data object within the compound object based on the metadata associated with the first data object stored in the metadata store; and
providing access to the first data object directly from the compound object at the determined location within the compound object without using an application that understands a format of the compound object.

17. The non-transitory machine-readable medium of claim 16, wherein the access to the first data object within the compound object is provided via a standard file system call of a file system that manages files stored in the storage, including the compound object and the metadata store.

18. The non-transitory machine-readable medium of claim 16, wherein the method further comprises exporting the first data object in a namespace of a file system using the extracted metadata associated with the first data object, such that the first data object is accessible via a standard system call of the file system.

* * * * *